INVENTOR
WILLIAM J. GREENE
BY
Pennie, Edmonds, Morton, Barrows & Taylor
ATTORNEYS United States Patent Office 2,747,152
Patented May 22, 1956

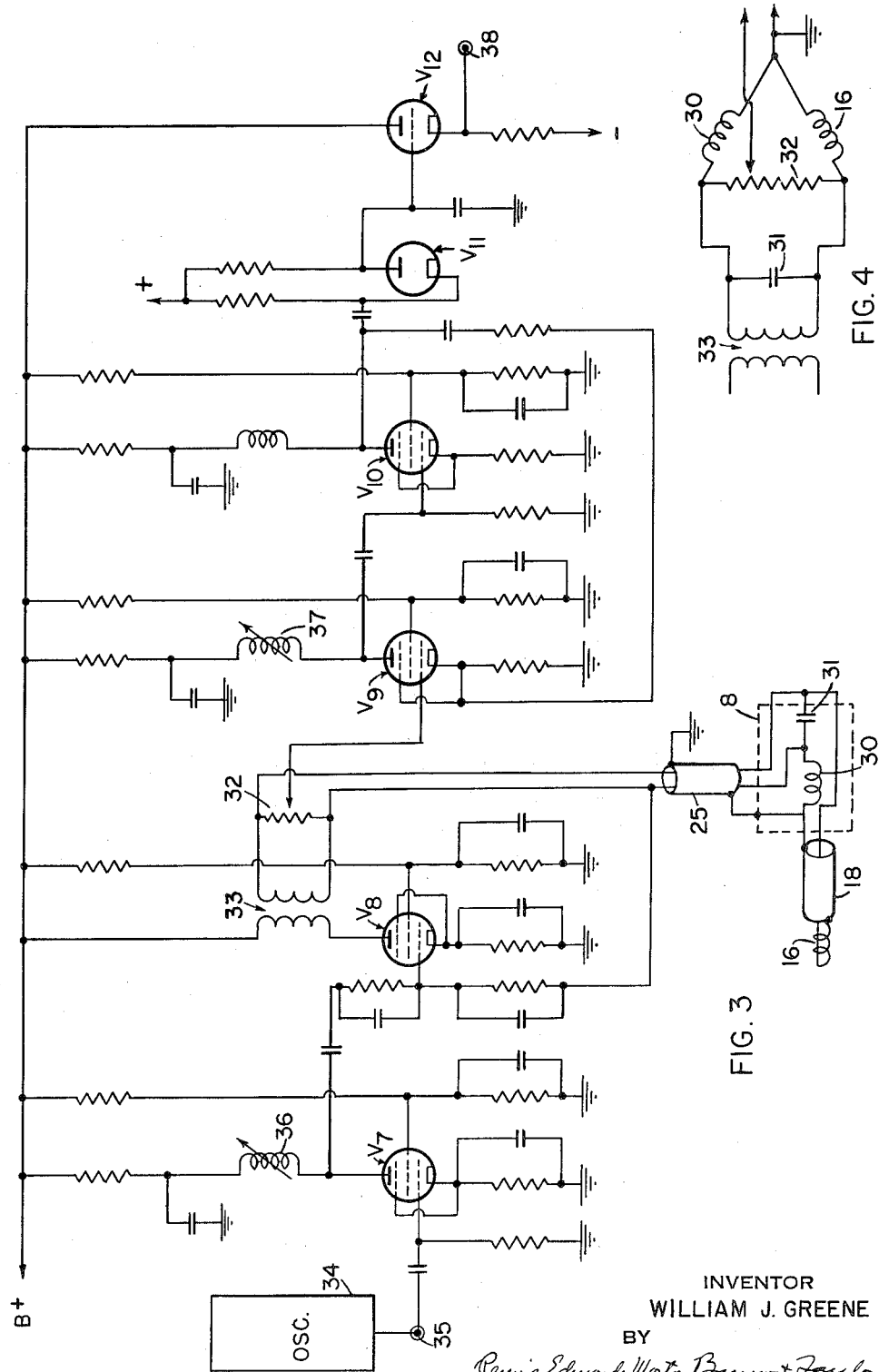

2,747,152

TORCH SPACING CONTROL

William J. Greene, Scotch Plains, N. J., assignor to Air Reduction Company, Incorporated, a corporation of New York Application August 1, 1951, Serial No. 239,825

5 Claims. (Cl. 318—286)

This invention relates to the control of the spacing between the tip of a gas torch and the surface of a workpiece that is being cut, welded or otherwise acted upon by the torch.

In mechanical cutting, welding and heat-treating apparatus of the type employing a gas torch it is desirable to maintain the tip of the torch at a uniform distance from the work surface, and it is the object of this invention to achieve this automatically with a high degree of precision and reliability.

Heretofore, torch tip spacing has been controlled by various means including: mechanically, by a guide roller that runs on the work surface and supports the torch; optically, by the use of a photo-electric cell to detect changes in luminosity of the torch flame which accompany variations in torch spacing; and, electrically, by detection of change in resistance of the torch flame, or detection of change in conductivity of a liquid jet adjacent the torch flame. Certain of these means are better adapted to one application than to another, but none is as accurate and reliable as the system of the present invention.

In general, the apparatus of the invention comprises a high-frequency sensing element or probe of which the impedance is varied by its proximity to the workpiece. Changes in probe reactance or effective resistance (both of these being here included in the term "impedance") are converted, by a suitable electronic circuit including a source of high-frequency current, into an electrical signal which is proportional to the distance of the probe from the surface of the workpiece. The torch is movable toward and away from the workpiece by a prime mover or motor which may be of the pneumatic, hydraulic or electric type. The speed and direction of operation of the motor are in turn controlled by a positioning mechanism in response to the electrical signal so as to maintain the torch tip and the workpiece substantially at a preselected distance apart.

Since it is the spacing between the torch tip and the workpiece which is to be regulated and maintained substantially constant, it is immaterial whether the torch tip or the workpiece (or both) be actually moved with respect to the opposing element. Hence, although for brevity, the following description and claims refer to adjusting or moving the torch or torch tip with respect to the workpiece this language is intended to include the equivalent movement of the workpiece with respect to the torch tip, the mechanism defined in the claims or its equivalent being required in either case. Furthermore it will be evident that the apparatus according to the invention is not limited to the control of torch tip spacing because it obviously is applicable to many other uses where it is desired to maintain substantially constant the distance or spacing between any two relatively movable members.

The nature of the invention and the manner in which it may be used will be more clearly understood from the following description considered in connection with the drawings in which:

Fig. 3 is a circuit diagram of an alternative embodiment of the invention, more specifically, an impedance sensitive system;

Fig. 4 is a diagram drawn in bridge form of the pick-up portion of the system of Fig. 3;

Figure 1:
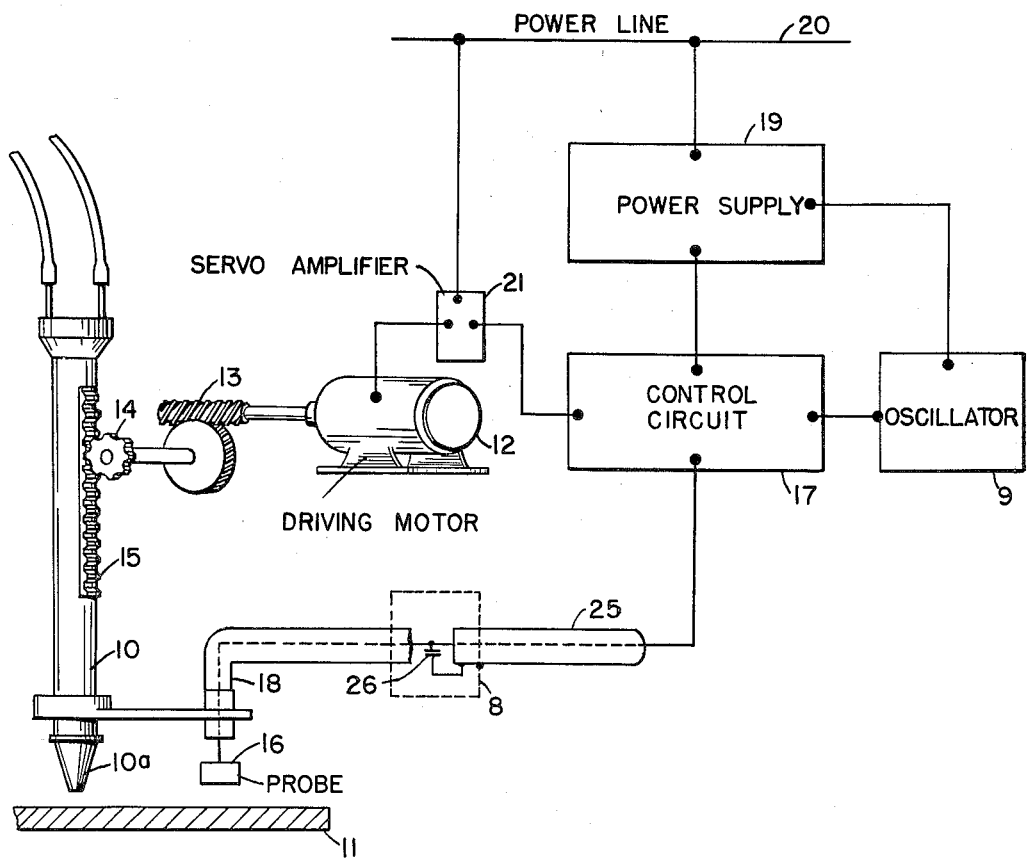
Fig. 1 is a block diagram of a control system in accordance with the invention.

Referring now to Fig. 1, a gas torch 10 is illustrated in operative position with respect to a workpiece 11, the latter being assumed to comprise a metal or other electrically conductive material. A driving motor 12, coupled through a worm drive 13 rotates a pinion 14 in engagement with rack 15 on the torch. Motor 12 is of the reversible type so that it may be employed to raise and lower the torch in respect to the workpiece. Alternatively, the motor 12 can be arranged to move the workpiece with respect to the torch tip. A probe 16 is mechanically secured to the torch, preferably adjacent to or surrounding the torch tip 10$a$. Regardless of which member moves and which is stationary it is preferable to mount the probe on the torch as described above, although under special circumstances the probe might be fixed to the work. Probe 16 is here represented as a block because the electrical nature thereof may differ as desired, or as is appropriate depending upon the type of control circuit to which it is connected. It comprises an electric sensing element which usually would be either inductive or capacitive in nature. An inductive sensing element may comprise a small coil; and a capacitive sensing element may comprise a small condenser or equivalent element of which the electrostatic capacity is modified in relation to its spacing from the surface of the workpiece. The sensing element, or probe 16, is preferably connected to control circuit 17 through suitable coaxial cables 18, 25.

The nature of control circuit 17 may differ, depending, for example, upon the circumstances under which it is to be employed. Three different forms of control circuit in accordance with the invention are hereinafter described, but in general they are of the electronic type. Oscillations of suitable frequency are supplied to the control circuit from oscillator 9, and the control circuit and the oscillator are supplied with suitable operating voltages from power supply 19, which, in turn, is fed from a power line 20.

The driving motor 12 is coupled to control circuit 17 through servo-amplifier 21 in such a manner that the motor can be operated in either direction at any required speed automatically in response to the spacing between the probe 16 and the surface of the workpiece 11. Servo-amplifiers, together with the necessary connections thereto, which are suitable for this purpose are well-known in the art and need not be further described.

Figure 2:
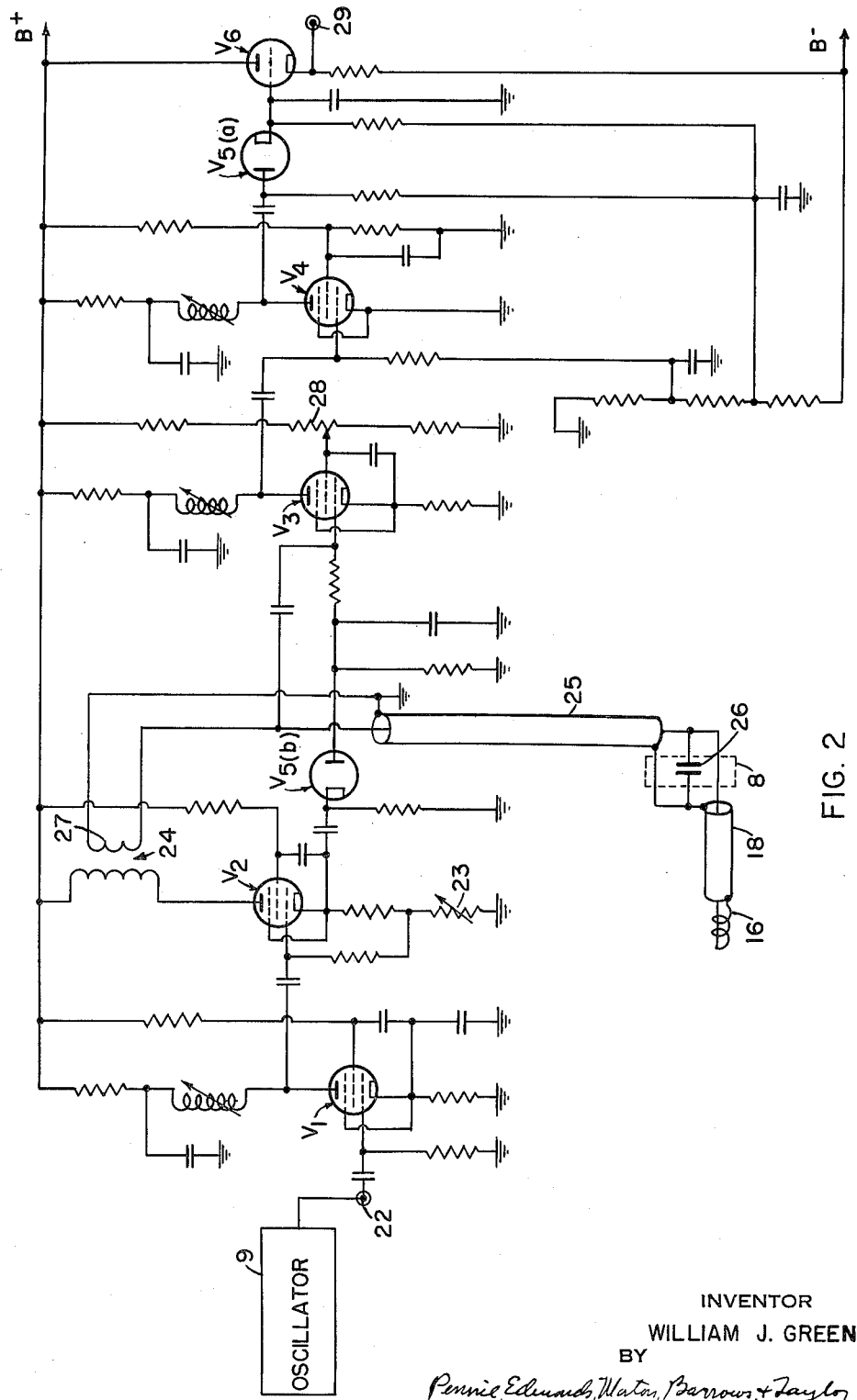
Fig. 2 is a circuit diagram of a preferred embodiment of the invention, more specifically, an amplitude sensitive system.

A circuit diagram of control circuit 17 is shown in Fig. 2. For purposes of illustration it may be assumed that this control circuit is fed from a continuous wave oscillator 9 having an output of approximately 0.1 volt, R. M. S., at 2 megacycles. In general, the control circuit, as shown, comprises a class A amplifier including tube $V_1$, a high-impedance output driver stage including tube $V_2$, two class C amplifiers including tubes $V_3$ and $V_4$, a detector $V_{5(a)}$, and a cathode follower output including tube $V_6$. All of the amplifier stages are coupled in cascade. Tube section $V_{5(b)}$ comprises a diode which is employed for automatic volume control to prevent changes in the oscillator amplitude from affecting the output signal. Sections $V_{5(a)}$ and $V_{5(b)}$ may conveniently be in the same tube, such as a tube of type 6H6.

Oscillator 9 is, as shown, connected to the control circuit through input terminal 22 so that the first amplifier tube $V_1$ can amplify the oscillator output to produce a constant grid-to-cathode excitation for the driver tube $V_2$, for all adjusted positions of the variable cathode resistor 23. The driver tube $V_2$ may be of the 6AG7 type, and variable resistor 23 may be of 1000 ohms.

The output circuit of tube $V_2$ is coupled to probe 16 by a transformer 24, one winding of which is connected in the anode circuit of $V_2$ and the other winding of which is connected to probe 16, which, in this embodiment, comprises a small induction coil. In one instance, the coil comprising probe 16 was formed of ⅛-inch copper tubing wound in three turns in a rectangle of approximately 2½ inches length by 1½ inches width, in outside dimensions. Copper tubing was employed for the coil to permit water-cooling, which is very desirable if the apparatus is employed in connection with operations on steel blooms at rolling temperatures. If watercooling of the probe is not required, insulated wire of a type which will withstand high temperatures may be used; and in this event a coil of considerably higher inductance can be had within the same physical dimensions as would permit a coil of relatively only small inductance when water-cooling is required. By enclosing the water-cooled coil in a case of machinable lava, it may be subjected to elevated temperatures without damage.

The inductance of the above-described three-turn coil is very small and, therefore, the length of coaxial cable 18 should be as short as feasible, and the construction of the coaxial cable should be such as to introduce in itself a minimum of inductance. Also, a suitable phase-shift condenser 26 preferably should be provided to tune the probe circuit inductance to correct the power factor, and such condensers will usually not withstand high temperatures. However, from an electrical standpoint, the condenser should be as close as possible to the probe coil in order to minimize the effect of the distributed inductance between the condenser and the coil. It has been found in practice that, by spacing the condenser about three feet from the torch tip, the condenser is protected from damaging temperature without introducing appreciable inductance in the length of coaxial cable 18, provided the cable is properly designed. The phase-shift-correcting condenser is enclosed in a shielding box 8, as shown.

A construction of coaxial cable suitable for the purpose above-mentioned comprises two concentric brass tubes electrically insulated from each other by a spiral wrap of mica tape, .010 inch thick, around the external surface of the inner tube. The inner tube is ⅞-inch outside diameter with ⅛-inch wall thickness, and the outer tube is 1 inch outside diameter with .065 inch wall thickness. Thus, the nominal inside diameter of the outside tube is .870 inch to provide a snug fit. By placing a jacket of 1½-inch tubing around the mentioned outside tube, and circulating water in the intervening space, the coaxial cable may be water cooled. If the path of the circulating water is through the mentioned outer jacket, then through the ⅛-inch tubing comprising the probe coil, and thence returning through the inner bore of the tube which forms the inner coaxial member, the probe as well as the inner coaxial cable may be maintained at a sufficiently low temperature. All of the tubing above referred to may be of seamless brass. The inductance of the cable which connects the probe 16 with the tuning condenser 26 may be maintained sufficiently low in respect to the inductance of the probe coil, by limiting the length of coaxial cable 18 to about 3 feet and by minimizing the inductance thereof by minimizing the space between the inner and outer conductors, as by separating them only with the thin layer of mica tape above described. The remaining length of coaxial cable 25 may preferably comprise a standard flexible coaxial conductor of 50 or 70 ohm characterisic impedance, and it need not be designed to minimize the distributed inductance. Also it may be as long as 100 feet or more.

When the probe comprises an inductance coil, as previously mentioned, the inductance, and hence the impedance thereof, decreases as the coil approaches a metallic or conductive workpiece regardless of whether the material thereof is magnetic or non-magnetic. Due to the fact that the coil is energized by a high-frequency current (here assumed, for example, to be 2 megacycles), the field does not penetrate into the base metal because of the flow of eddy currents in the surface skin. The mentioned reduction of inductance is, therefore, caused by the constriction of the magnetic field due to the presence of this conducting material. It has been found that black oxide of iron, which is magnetic although non-conducting, causes the inductance to increase because eddy currents cannot be induced in it. However, even a thick coating of oxide on an iron workpiece does not prevent the normal reduction of inductance when the metal is brought into the field of the probe coil.

If the probe comprises a condenser, rather than an inductance, the positions of coil 16 and condenser 26 are interchanged. In this case the value of the inductance would be larger than it can be in the form of a probe of the nature described, and the value of the condenser would, therefore, necessarily be smaller than .008 mfd., which is suitable for condenser 26 as shown in Fig. 2. In this event the coaxial cable 25 should be designed for low capacitance rather than low inductance, and such cables are known in the communication art.

Since the driver stage including tube $V_2$ comprises a constant-current source of power, any change in the impedance of the load on the secondary winding 27 will produce a change of voltage across this winding. The impedance load presented by the probe coil 16 in parallel with power-factor-correcting condenser 26 reduces sharply with reduction of probe coil inductance. Thus it may be seen that the spacing of the probe coil from the work is reflected in the grid voltage of the amplifier tube $V_3$. This tube obtains its negative bias from the rectified cathode voltage on the preceding driver stage, and this negative bias is adjusted by the variable cathode resistor 23, so that peaks of the voltage wave from the transformer 24 drive the grid of this tube to zero potential. Under this condition of operation, the anode voltage wave of tube $V_3$ may have a peak amplitude of approximately 25 volts in the example described. This anode voltage swing is adjustable by the screen potentiometer 28 so that the amplifier $V_4$ will be driven to zero bias. The peak output on the anode of amplifier tube $V_4$ is here assumed to be approximately 100 volts, which, when rectified by diode $V_{5(a)}$, if biased to —50 volts, produces a +50 volt output from the cathode follower $V_6$. This output, which appears at output terminal 29, comprises a signal voltage which, in this particular circuit arrangement, may vary from —50 volts to +50 volts, and this signal is impressed on the electronic servo-amplifier 21 (Fig. 1) to control motor 12, which, in turn, controls the torch spacing.

At optimum spacing of the torch, the signal voltage impressed on the servo-amplifier is zero. As more metal is placed in the field of the probe, as when the torch becomes too close to the work, the inductance of the probe decreases. As a result, the voltage swing on the grids of the amplifiers $V_3$ and $V_4$ decreases, and thus the rectified output voltage, or signal, decreases. If the probe moves still closer to the work, amplifier $V_3$ will be cut off completely and the output voltage will then drop to —50 volts. A change of signal voltage of this magnitude is more than ample to control the servo-amplifier, and thus to control the motor with considerable accuracy and rapidity of response.

In order that the control signal may be as nearly linear as possible with respect to the spacing of the probe from the workpiece it is preferable to employ a tube of the remote cut-off type, such as type 6SK7, for the second class C amplifier tube, $V_4$. The characteristic of this tube is such as to compensate for the characteristic of the probe inductance which changes more rapidly as the spacing from the work decreases.

The output power of the control circuit 17 (at terminal 29) would ordinarily be only a fraction of a watt. Although this is sufficient for providing an indication or a control signal, it is insufficient for the operation of the motor 12. Therefore, the servo-amplifier 21 is included to raise the power output to a level sufficiently high to operate the motor. The action of the servo-amplifier is controlled by a signal from the control circuit so that it will cause the motor to rotate in either direction or stand still in response to the signal. Because of the inertia of the motor armature, the torch position will tend to overshoot the balance position as determined by the probe, and it would continue to oscillate about this position in a manner called hunting, unless the servo system were properly damped. There are many methods of damping servo mechanisms, but the more customary and efficient methods involve the use of a suitable electrical damping mechanism incorporated in the servo-amplifier unit 21. Also, the motor itself can be damped by coupling the motor shaft to one or more discs immersed in a viscous fluid. The function of this servo-amplifier unit is therefore to amplify the signal from the control circuit to a level at which it can operate the motor, to control the operation of the motor in either direction as well as to hold it at standstill, and also to amplify the signal in a manner to achieve stability and absence of hunting.

Alternative modifications of the specific system illustrated in Fig. 2, all of the amplitude sensitive type, will occur to those skilled in the art. In one such arrangement the probe impedance forms part of a network fed from a constant frequency source, as in the case of the system of Fig. 2, and changes in inductance or capacity resulting from a change of spacing between the probe and the workpiece produces a proportional phase-shift in the voltage across the network, or a part of the network. When amplified and compared with the oscillator or driver phase by a phase-sensitive detector, this signal provides an output signal voltage proportional to the spacing between the torch and the workpiece.

In another alternative control circuit known in the art which can be employed in accordance with the invention, the probe inductance, or capacity as the case may be, is connected as part of a frequency-controlling tank circuit included in an oscillator, change in spacing then produces changes in the output frequency of the oscillator. A limiter and discriminator fed from the oscillator provide an output voltage which again is proportional to the change in frequency, which, in turn, is proportional to the spacing between the probe and the workpiece.

An alternative control system in accordance with the invention generally illustrated in Fig. 1, is shown in the circuit diagram, Fig. 3. This circuit, for convenience, may be referred to as an "impedance sensitive" system because changes in probe impedance are converted by a suitable electronic circuit into an electrical signal which is proportional to the distance between the probe and the workpiece. This signal in turn, as before, controls the torch-spacing mechanism so as to maintain the torch spacing substantially constant.

In the circuit arrangement illustrated in Fig. 3, the probe impedance forms one arm of a bridge network which is fed across a constant-frequency source. An equivalent arrangement would result if the probe impedance formed part of a network included in the same arm of the bridge. As a result, any change produced by the presence of workpiece material introduced into the probe field in respect either to the inductive reactance component or the effective resistance component of the probe will change the output voltage of the bridge, when this voltage is amplified and detected a signal is generated which is proportional to the distance between the probe and the workpiece.

It may be assumed that the impedance sensitive system of Fig. 3, constitutes the "control circuit" 17 of Fig. 1. As in the case of the amplitude sensitive system above described, it may also be assumed that probe 16 comprises an inductance coil which may be constructed as already described. This probe is electrically connected to the electronic control circuit by coaxial cable portions 18 and 25. Between cable portions 18 and 25 are included an inductance coil 30 and a condenser 31 which are connected in a bridge network, more clearly illustrated in Fig. 4. In this bridge network, coil 30 comprises one arm and inductance 16 of the probe comprises a symmetrical arm across which a suitable potentiometer 32 is connected. Adjustment of the potentiometer controls the magnitude of the signal from the probe which is impressed upon the control circuit. Coil 30 comprises a comparison standard with respect to the impedance of probe coil 16 and cable 18. Condenser 31 is selected in respect to capacity value to provide proper power factor adjustment. Condenser 31 is mounted and connected at the probe end of cable 25 so that it will be effective in reducing reactive current in cable 25 drawn by both the probe and comparison standard inductances in series.

Since, as in the system of Fig. 2, this control system responds to changes in probe impedance, it is desirable that the length of coaxial cable 18 be as short as practicable as well as designed to minimize its own impedance. Therefore, the same length of about three feet is satisfactory as not introducing excessive impedance, while being long enough to permit the shielded coil and condenser elements 30 and 31 to be removed from the heat of the torch and the workpiece sufficiently to avoid damage to those components, even though they be enclosed in a shielding box 8. The length of cable section 25 is not so critical, and with proper design of the cable the control circuit apparatus may be placed as far as approximately 100 feet away from the probe coil 16.

Energizing voltage for the system of Fig. 3 is generated by oscillator 34. The principal requirements for a suitable oscillator are that it be stable, viz, have minimum frequency drift with respect to temperature, power supply voltage, etc. A crystal controlled or "Weinbridge" type of oscillator would be satisfactory. Such oscillator may be operated at a frequency within a rather wide band, such as between 500 kilocycles and 500 megacycles. The upper frequency of satisfactory operation is limited by the radiation effect of the probe element whether it be a coil or a condenser. Any appreciable radiation of the energy impressed on the probe naturally results in decrease in efficiency, but also causes undesirable radio interference. Appropriate shielding of the various components, at least of the input portion of the system, is desirable to minimize radiation as well as to decrease interference by external sources, with normal operation of the circuit. The lower frequency of operation is limited largely by the resulting magnetic effect of the workpiece, if of magnetic material, on the change of effective impedance of the probe coil. When low frequencies are employed, the magnetic field surrounding the probe coil can penetrate deeply into metallic materials, and as a result, magnetic material would have an effect on the probe coil different from that of non-magnetic material. In other words, the inductance would increase in the presence of magnetic material and would decrease in the presence of non-magnetic material. Furthermore, at low frequencies the inductive reactance of the probe coil would not be large as compared with its resistance, and this would tend to decrease the magnitude of the resulting signal. In view of the foregoing considerations, it has been determined that the mentioned frequency of approximately two megacycles constitutes a useful compromise, although other frequencies may be preferable under different circumstances.

The power output of oscillator 34 need not be great; power of the order of one watt being ordinarily sufficient. It is preferable that the output waveform should be of pure sine type with a minimum of harmonic content, such as would customarily be utilized for laboratory bridge measurements.

As shown in the circuit diagram of Fig. 3, the output of the oscillator 34, of the nature above described, is connected to the input terminal 35 of the control system which is coupled to the input of a preamplifier tube $V_7$. In order to derive a maximum voltage gain in this amplifier, it is desirable to connect a variable inductance 36 in the anode circuit of tube $V_7$, and to adjust this inductance to resonate with the distributed capacity in the wiring of this stage including the inter-electrode capacities of the tube itself.

The second amplifier stage is of the driver type, and includes tube $V_8$. The output voltage of the driver stage is coupled to the following stage through transformer 33 which introduces the energizing voltage into probe coil 16. This input voltage, as fed into the bridge circuit, should, as above mentioned, be of constant frequency and constant amplitude, and, when modified by changes in reactance of probe coil 16, constitutes a fluctuating voltage or output signal, as determined by corresponding variations in spacing between the probe coil and the workpiece. The average magnitude of the output voltage or signal may be manually adjusted by means of potentiometer 32, but the actual fluctuations are subject to modification only by the mentioned spacing.

The voltage fluctuations from the bridge circuit constituting the initial control signal are further amplified in two amplification stages of the class A type including tubes $V_9$ and $V_{10}$. In order to increase the gain of the amplification stage including tube $V_9$, a variable inductance 37 may be included in its anode circuit, as shown, and this inductance should, like inductance 36, be tuned to resonance with the frequency of the amplified voltage.

The amplified signal at the output of amplifier $V_{10}$ is coupled to a detector or rectifier stage including diode $V_{11}$. The unidirectional output of rectifier $V_{11}$, is fed into tube $V_{12}$ which is connected to comprise a cathode follower output stage. In general, tube $V_{12}$ corresponds to tube $V_6$ of Fig. 2. If a bias voltage of $+50$ is connected to rectifier $V_{11}$ at the terminal marked "$+$," as shown, an output signal which fluctuates in the neighborhood of 50 volts will be impressed on output terminal 38, and this fluctuating voltage may be employed as the control voltage signal to control the operation of the servo-amplifier 21, Fig. 1, which, in turn, controls the driving motor 12.

The operation of the impedance-sensitive control system of Fig. 3 is as follows: Potentiometer 32 is first adjusted so that the bridge circuit, which includes inductances 16, 30 and the two portions of potentiometer resistance 32, is balanced when no conducting material is in the field of the probe. In this case, the output voltage at terminal 38 will be approximately $+50$ volts if a bias voltage of that magnitude is connected to the rectifier $V_{11}$, to suggest an example. As conducting material is introduced into the probe field, the impedance of the probe coil changes both in phase and magnitude. The proportion of inductance change to resistance change is dependent upon permeability, resistivity and hysteresis characteristics of the material of the workpiece. These changes in impedance unbalance the bridge circuit. The amplified unbalanced bridge voltage, or signal, tends to produce a negative voltage when rectified at tube $V_{11}$. As a result, the output voltage at terminal 38 will decrease from the assumed $+50$ volt value to a lower value, depending upon the actual spacing of the workpiece from the probe element.

It will be evident to those skilled in the art that various modifications of the above-described impedance-sensitive control system may be made without departing from the spirit of the invention.

Figure 5:
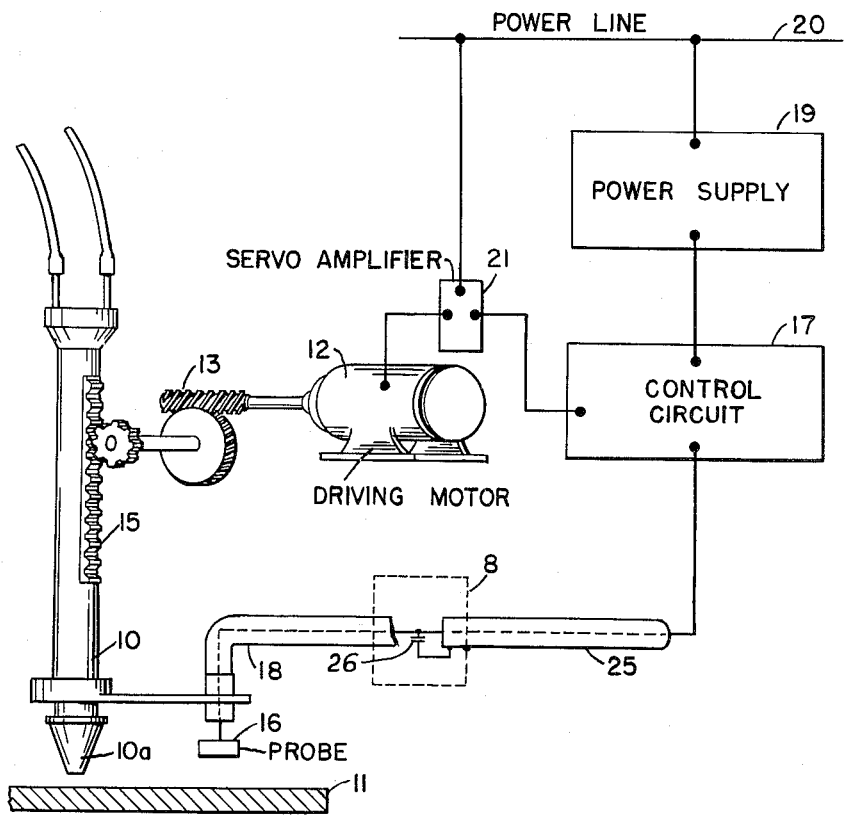
Fig. 5 shows in block diagram form a further modification of the invention.

The embodiment of the invention represented in the block diagram of Fig. 5 is similar to that of Fig. 1, except for the omission of the oscillator 9 of Fig. 1. The reason for the omission of the representation of the oscillator in this diagram is that the control circuit itself includes a source of oscillations. Consequently, the diagram of Fig. 1 can be said also to illustrate the modification now to be described.

As in the previously described modifications, the embodiment of Fig. 5 employs a probe element energized at high frequency, the impedance of the probe being varied by its proximity to the workpiece. Changes in probe impedance are converted into an electrical signal which is proportional to the distance of the probe from the workpiece, and such signal is in turn applied to control torch-positioning mechanism to maintain the torch spacing substantially constant. In the present embodiment the changes in probe impedance are converted into electrical control signals by means of a "losses sensitive" system.

Figure 6:
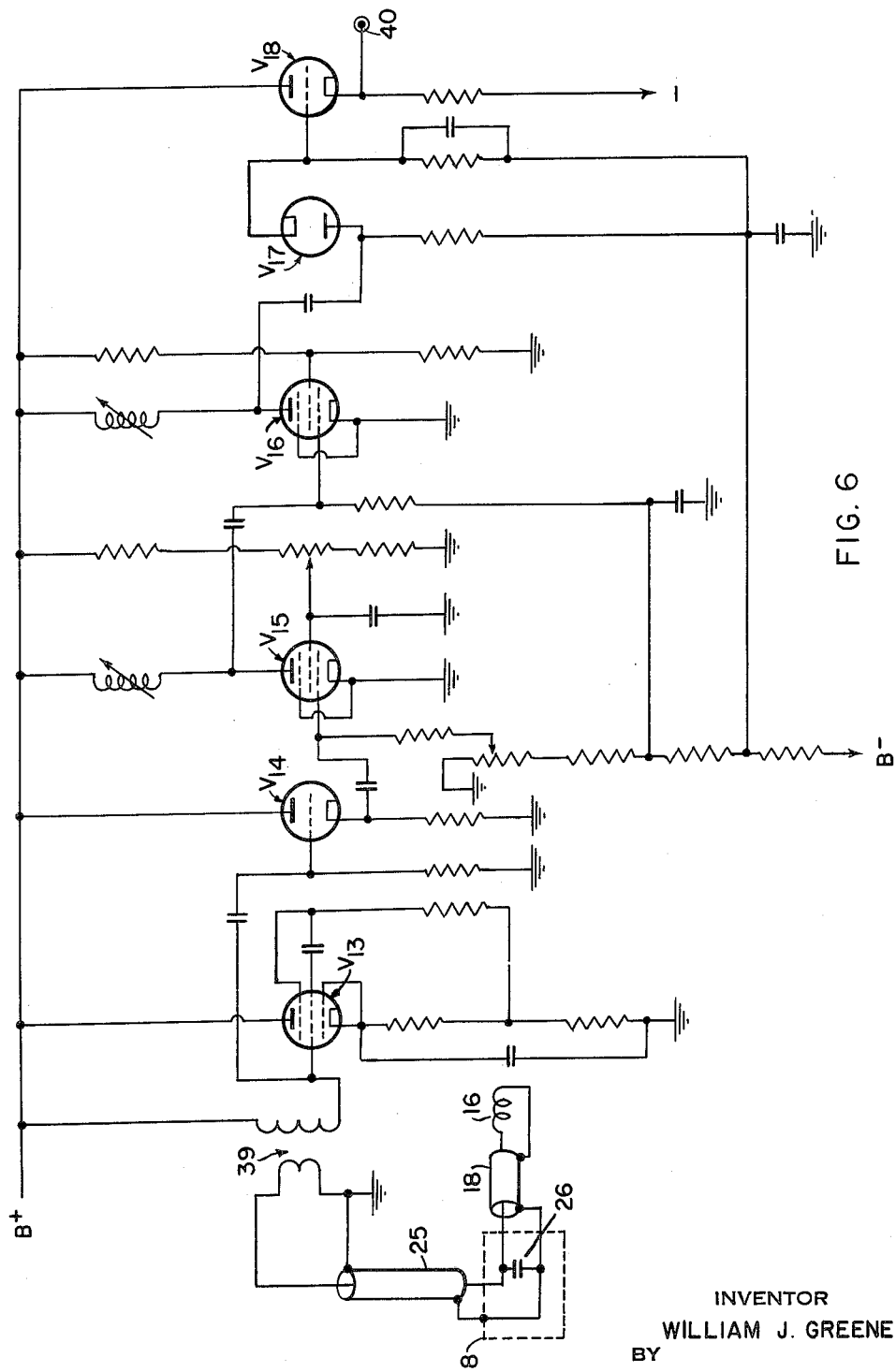
Fig. 6 is a circuit diagram of an embodiment of the system of Fig. 5, more specifically, a losses sensitive system.

A circuit diagram including a suitable losses sensitive system is shown in Fig. 6, it being assumed that this system is incorporated in the "control circuit" 17 of Fig. 5. Although various types of systems are known by which a signal can be generated in response to losses introduced in an input circuit thereof, the form presently selected by way of example includes a transitron oscillator of the negative resistance type. Other suitable oscillators, such, for example, as a resistance-stabilized oscillator, or a Colpitts type oscillator, could be used.

When a metal of relatively poor conductivity (high resistivity) is brought into the field of the probe connected to such an oscillator, eddy-current and hysteresis losses in the metal are reflected in the probe circuit. Metals having a resistivity of approximately 8 microhms per centimeter, or more, can be satisfactorily used with the present control system. Since, by definition, the negative resistance oscillator automatically adjusts its oscillation amplitude to compensate for the mentioned increased losses, the resulting change in oscillation amplitude may be converted into an output signal voltage which is proportional to the distance between the probe and the workpiece. Such signal voltage may then be employed through a servo-amplifier to control a driving motor as described in connection with the preceding embodiments.

In the circuit diagram of Fig. 6 the probe 16 is, as before, represented as an inductance coil, although, also as before, a condenser could be substituted with appropriate circuit modifications. This probe is connected, as in the arrangement of Fig. 2, to the control circuit by means of two sections 18, 25 of coaxial cable between which a phase-correcting condenser 26 is connected, as shown. The transitron oscillator includes tube $V_{13}$ to which the probe circuit is coupled by means of transformer 39. This transformer, together with the inductance of probe coil 16, the capacity of condenser 26 and the distributed inductance and capacity of the probe circuit, are components of the oscillator tank circuit which controls the oscillator output.

The theory of operation of the transitron oscillator is described by Cledo Brunetti in the Proceedings of the Institute of Radio Engineers, 1939, pages 88–94. An oscillator of this type is here preferred because a very small change of losses induced in the tank circuit will produce a very large change in voltage output of the oscillator if the circuit is properly designed. Such increased output reduces the gain requirements of the amplifier stages following the oscillator so that fewer tubes are needed. The changes in losses in the probe circuit also result in changes in oscillator frequency, but such frequency changes may be ignored in the present instance because the following stage is not sensitive to frequency changes, but only to voltage amplitude changes.

Tube $V_{14}$ is connected to comprise a cathode follower stage and is here used as a buffer between the oscillator and the following two amplifier stages. These amplifier stages are of the class C type and include tubes $V_{15}$ and $V_{16}$, respectively.

The output from amplifier $V_{16}$ is coupled into the detector or rectifier comprising diode $V_{17}$. The resulting unidirectional voltage is then fed into cathode follower tube $V_{18}$ which is biased at a high negative voltage such as 150 volts, for example. The output voltage of rectifier $V_{17}$ is connected so as to oppose the bias voltage on the cathode follower, and thus to change the voltage at the output terminal 40 of the cathode follower proportionately. Terminal 40 is connected to the input of the servo-amplifier 21 in the complete system shown in Fig. 5. Other elements of the system may be assumed to be similar to corresponding elements previously described, especially in connection with Fig. 2.

As in the preceding systems, the specific circuit arrangement illustrated in Fig. 5 is shown by way of example only, since various equivalent arrangements within the scope of this invention will occur to those skilled in the art.

I claim:

1. Apparatus for automatically controlling the spacing between a torch tip and the electrically conductive surface of a workpiece, comprising motor means for moving the torch tip towards and away from the work surface, an electrical sensing element mounted in fixed relationship to and movable with the torch tip and disposed in electrical cooperation with the surface of the workpiece through a variable airgap of negligible dielectric losses between said element and a portion of the surface of said workpiece external of the torch flame, said element having an impedance characteristic which is varied by the electrical reaction of the workpiece through said airgap, a power force for said power means, electrical control means connected to said sensing element and responsive substantially solely to variations in said electrical characteristics, and connections from said electrical control means to said power source and said motor means such that the power to said motor means is controlled to actuate the same so as to maintain the torch tip and the workpiece spaced a substantially uniform distance apart.

2. Apparatus for automatically controlling and maintaining uniform the spacing between a torch tip and the surface of an electrically conductive workpiece, comprising motor means for moving the torch tip towards and away from the work surface, an inductive sensing element fixed to the torch so as to be movable therewith and disposed in inductive relation to a portion of the workpiece through a variable airgap of negligible dielectric losses, said element being disposed externally of the torch flame, the inductive characteristic of said inductance being varied in accordance with the proximity of said element and the surface of said workpiece, a source of high-frequency oscillations, an amplifier connected to amplify the output of said source, means coupling said element to said amplifier so as to modify the output current of the amplifier in accordance with variations in inductance of said element, and means operable in response to the modified output current from said amplifier for controlling the actuation of said motor means to maintain the torch tip and the workpiece spaced substantially at a preselected distance apart.

3. Apparatus for automatically controlling the spacing between a torch tip and the surface of an electrically conductive workpiece, comprising motor means for moving the torch tip towards and away from the work surface, an inductive sensing element of small inductance value fixed to the torch so as to be movable therewith and disposed in inductive relation to a portion of the workpiece through a variable airgap of negligible dielectric losses, said element being disposed externally of the torch flame, a source of high-frequency oscillations, first and second high-frequency amplifier stages, the first of which is fed from said source of oscillations and is of the driver type having a high-impedance output circuit, a high-frequency coupling transformer having one winding connected in said output circuit and a second winding connected in the input circuit of said second stage, coaxial cable means connecting said sensing element to the second winding of said transformer such that change of impedance of said sensing element changes the voltage across said second winding, said cable comprising inner and outer conductors of considerably less inductance than that of said sensing element, and a phase-shift-correcting condenser connected between said conductors at a point along said cable intermediate the extreme ends thereof and closer to the sensing element than to said transformer.

4. Means for automatically maintaining substantially constant the distance between two relatively movable members, which include an electrical impedance element disposed in fixed relation to a first of said members, means for generating high-frequency current, means including said element for modifying said current in accordance with impedance variations in said element due to variations in electrical reaction of the second of said members on said element resulting from small changes in spacing between said element and said second member, said second member having an electrically conductive area in juxtaposition to said element and the medium between said element and said area having negligible dielectric losses, a prime mover adapted to move at least one of said members with respect to the other so as to vary the distance therebetween, means for generating from said modified current an electric control signal which is a function of said spacing, a power source, means for operating said prime mover by power from said source, and means for controlling the operation of said prime mover in response to said control signal.

5. Means for automatically maintaining substantially constant the distance between two relatively movable electrically conductive members, which includes an electrical impedance element disposed in fixed relation to a first of said members, means for generating a high-frequency voltage, means including said element for modifying said voltage in accordance with empedance variations in said element due to variations in electrical reaction of the second of said members on said element resulting from small changes in spacing between said element and said second member, the medium between said element and second member having negligible dielectric losses, means for generating from said modified voltage an electric control signal which is a function of the modifications of said voltage, electric motor means adapted to change the distance between said members in either direction, and means controlling the operation of said motor means in response to said signals, whereby to maintain said distance substantially constant.

References Cited in the file of this patent

UNITED STATES PATENTS

| | | |
|---|---|---|
| 2,357,745 | Kliever | Sept. 5, 1944 |
| 2,437,661 | Coake | Mar. 9, 1948 |
| 2,508,752 | Drugmand | May 23, 1950 |
| 2,534,958 | Deming | Dec. 19, 1950 |
| 2,560,165 | Garman et al. | July 10, 1951 |
| 2,576,611 | Lang et al. | Nov. 27, 1951 |
| 2,593,339 | Ostermann et al. | Apr. 15, 1952 |
| 2,611,115 | Johnston | Sept. 16, 1952 |